United States Patent
Glick et al.

(10) Patent No.: US 6,998,157 B2
(45) Date of Patent: Feb. 14, 2006

(54) THERMOFORMABLE PACKAGING FILM

(75) Inventors: William J. Glick, Wilmington, DE (US); I-Hwa Lee, Wilmington, DE (US)

(73) Assignee: E.I. du Pont de Nemours and Company, Inc., Wilmington, DE (US)

( * ) Notice: Subject to any disclaimer, the term of this patent is extended or adjusted under 35 U.S.C. 154(b) by 0 days.

(21) Appl. No.: 10/094,083

(22) Filed: Mar. 8, 2002

(65) Prior Publication Data

US 2003/0044551 A1    Mar. 6, 2003

Related U.S. Application Data

(60) Provisional application No. 60/280,548, filed on Mar. 30, 2001.

(51) Int. Cl.
  *B65D 1/00* (2006.01)
  *B32B 27/08* (2006.01)

(52) U.S. Cl. .................. 428/35.7; 428/34.1; 428/35.8; 428/35.9; 428/36.1; 428/36.6; 428/500; 428/515; 428/516; 428/520; 428/522; 428/689

(58) Field of Classification Search ............ 526/328.5, 526/329, 329.7, 330, 331; 525/227, 329.7, 525/330.6; 428/35.7, 483, 516, 522, 35.9, 428/36.1, 36.6
See application file for complete search history.

(56) References Cited

U.S. PATENT DOCUMENTS

| | | | |
|---|---|---|---|
| 4,239,826 A * | 12/1980 | Knott, II et al. ............ 428/36.7 |
| 4,335,175 A * | 6/1982 | Webb .......................... 428/213 |
| 4,424,243 A * | 1/1984 | Nishimoto et al. ......... 428/34.9 |
| 5,198,401 A | 3/1993 | Turner et al. |
| 5,272,236 A | 12/1993 | Lai et al. |
| 5,278,272 A | 1/1994 | Lai et al. |
| 5,405,675 A * | 4/1995 | Sawka et al. ................ 428/195 |
| 5,405,922 A | 4/1995 | DeChellis et al. |
| 5,543,477 A * | 8/1996 | Latiolais et al. ............... 526/65 |
| 5,558,930 A | 9/1996 | DiPoto |
| 5,635,262 A * | 6/1997 | Best et al. ................ 428/36.92 |
| 5,679,422 A | 10/1997 | Lind et al. |
| 5,703,166 A | 12/1997 | Rajagopalan et al. |
| 5,824,746 A | 10/1998 | Harris et al. |
| 5,882,749 A | 3/1999 | Jones et al. |
| 5,882,789 A | 3/1999 | Jones et al. |
| 5,885,172 A | 3/1999 | Hebert et al. |
| 5,885,699 A | 3/1999 | Watson et al. |
| 5,888,714 A | 3/1999 | Bourdelais et al. |
| 5,895,694 A * | 4/1999 | Zavadsky et al. .......... 428/36.7 |
| 5,972,447 A | 10/1999 | Hata et al. |
| 5,981,047 A | 11/1999 | Wilkie |
| 6,017,615 A | 1/2000 | Thakker et al. |
| 6,025,442 A | 2/2000 | Harris et al. |
| 6,042,913 A | 3/2000 | Miranda et al. |
| 6,068,933 A | 5/2000 | Shepard et al. |
| 6,149,750 A * | 11/2000 | Parish, Jr. et al. .......... 156/154 |
| 6,166,142 A | 12/2000 | Zhang et al. |

FOREIGN PATENT DOCUMENTS

DE    3233693 A1    3/1984
EP    0432611 A2    6/1991

OTHER PUBLICATIONS

Hawley's Condensed Chemical Dictionary, 1997, John Wiley & Sons, Inc., thirteenth edition, p. 18.*
PCT International Search Report dated Aug. 21, 2002, for International application No. PCT/US02/10043.
Plastics and Rubber Materials and Applications Aug. 1978, Ion-containing polymers: their structure and applications, R. Longworth, E.I. du Pont de Nemours and Co., Inc., Research and Development Division. Wilmington, DE, pp. 75-88.
Mimi Y. Keating and I-Hwa Lee, E. I. du Pont de Nemours & Company, "Glass Transition, Crystallinity, Resin Stiffness, and Branch Distribution in Metallocene and Ziegler-Natta Ethylene 1-Olefins", J. Macromol. Sci.-Phys., B38(4), 379-401 (1999).

* cited by examiner

*Primary Examiner*—Harold Pyon
*Assistant Examiner*—Walter B. Aughenbaugh

(57) ABSTRACT

Disclosed are multi-layer thermoformable film constructions. At least one layer of the multi-layer construction is a polymer blend of: (a) 40–95% by weight of an ethylene-acrylic acid or methacrylic acid copolymer or of an ethylene-acrylic acid or methacrylic acid-alkyl acrylate or alkyl methacrylate copolymer with 30–70% of the acid groups of the acrylic acid or methacrylic acid of either copolymer neutralized with metal ions, and (b) 5–60% by weight of a metallocene catalyzed linear polyethylene.

8 Claims, No Drawings

THERMOFORMABLE PACKAGING FILM

This application claims the benefit of U.S. Provisional Application No. 60/280,548, filed Mar. 30, 2001.

BACKGROUND OF THE INVENTION

This invention is directed to a thermoformable packaging film and in particular to a multi-layer film that is used for packaging medical devices in a thermoformed package.

Co-extruded film laminates of ethylene-vinyl acetate copolymers/ethylene-acrylic acid copolymer ionomers have been used for packaging applications, in particular, for thermoformed packages for food stuffs as shown in Webb, U.S. Pat. No. 4,335,175 issued Jun. 15, 1982.

A co-extruded multi-layer polymeric film useful for packaging meat products in which the film has a core layer that can be a neutralized ethylene acid copolymer, such as, an ionomer, is shown in Lind, et al., U.S. Pat. No. 5,679,422 issued Oct. 21, 1997.

Thermoformable films having superior gas barrier properties, mechanical properties, and good appearance of a mixture of ethylene-vinyl alcohol copolymers and ethylene—(meth)acrylic acid copolymers have been used to make thermoformed containers for foods, medicines, agricultural products and other products that are deteriorated by exposure to air, are shown in Hata, et al., U.S. Pat. No. 5,972,447 issued Oct. 26, 1999.

These current film products, as illustrated by the aforementioned patents, do not provide a low cost packaging film for medical products that only are used one time, such as, syringes. There is a need for a low cost packaging film that is thermoformable, preferably has deep thermoformability, is abrasion resistant and puncture resistant. The multi-layer film of this invention can be formed by conventional processes for forming multilayer film and has these aforementioned properties.

SUMMARY OF THE INVENTION

This invention is directed to a thermoformable film comprising a composite structure of at least three layers firmly adhered to one another, a top and bottom layer and an inner layer;

wherein the top and bottom layer of the composite structure comprise a film layer of an ethylene-vinyl acetate copolymer comprising 1 to 25% by weight, based on the weight of the copolymer, of a polymerized vinyl acetate and 75 to 99% by weight, based on the weight of the copolymer, of polymerized ethylene and the inner layer of the composite structure comprises a film of a polymer blend of the following:
(a) 40 to 95% by weight, based on the weight of the polymer blend, of an ethylene based copolymer comprises repeating polymerized units of
  (1) at least 50% by weight, based on the weight of the copolymer, of ethylene,
  (2) 1 to 30% by weight, based on the weight of the copolymer, of acrylic acid or methacrylic acid; and
  (3) up to 40% by weight, based on the weight of the copolymer, of an alkyl acrylate or an alkyl methacrylate,
wherein the copolymer has 5 to 100% of the acid groups neutralized with metal ion selected from the following group: zinc, magnesium, sodium and lithium; and
(b) 5 to 60% by weight, based on the weight of the polymer blend, of a metallocene catalyzed polyethylene.

Other thermoformable film constructions, such as, a 2 layer construction and constructions greater than 3 layers, such as 5 layers, and a mono layer of the film of the blend of the ethylene based copolymer and the metallocene catalyzed polyethylene also are part of this invention.

DETAILED DESCRIPTION OF THE INVENTION

The thermoformable film of this invention is a multi-layer film preferably formed by a conventional blown film process. Other processes, such as, a film casting process or a film laminating process also can be used to produce the thermoformable film. A typical thermoformable film has at least three layers all firmly adhered to one another, i.e., two outer layers of film and an inner layer of film. Additional layers can be incorporated to enhance properties of the film if required. The two outer layers of the film are of an EVA (ethylene-vinyl acetate) copolymer and the inner layer is a blend of an ionomer of an ethylene-acid copolymer at least partially neutralized and a metallocene catalyzed polyethylene. The film of this invention can be deeply thermoformed, has a relatively low cost, has good abrasion resistance and puncture resistance that makes it particularly suitable for packaging single use medical supplies, such as, syringes, that are widely used throughout the world.

Other film constructions also are part of this invention, such as a two layered structure of an ethylene-vinyl acetate copolymer (EVA) and a layer of the blend of an ethylene-acid copolymer (Ionomer) at least partially neutralized and a metallocene catalyzed polyethylene, such as, a metallocene catalyzed linear polyethylene (m-LPE). Also, multi-layer constructions over three layers, such as, a five layer construction, for example, EVA//Ionomer/-m-LPE//EVA// Ionomer/-m-LPE//EVA, are advantageous for some packaging uses.

A mono layer film of the blend of Ionomer and a metallocene catalyzed polyethylene, such as, m-LPE, also is part of this invention. Typically useful films are blends of Ionomer and metallocene catalyzed linear low density polyethylene (m-LLPDE). Other useful film blends are Ionomer/ m-LLPDE/EVA. Typically, 2–15% by weight, based on the weight of the blend, of EVA can be used.

The word "copolymer" as used herein embraces a polymer formed with two or more monomers.

The term alkyl(meth)acrylate as used herein refers to alkyl esters of acrylic acid and methacrylic acid.

The total thickness of a typical 3 layer film construction is 25–500 microns and preferably, 100–300 microns. The inner layer typically is 20–80% of the total thickness and each outer layer is 10–40% of the total thickness.

The outer layer of the film is an EVA copolymer containing 1 to 25% by weight of polymerized vinyl acetate and correspondingly 75 to 99% by weight of polymerized ethylene. Preferably, the copolymer contains 2 to 15% by weight of polymerized vinyl acetate and 85 to 98% by weight of polymerized ethylene.

These EVA copolymers typically have a melt index (MI) of 0.1 to 50, preferably, 0.3 to 10 g/10 minutes determined by ASTM D 1238 using condition E (2190 g, 190° C.).

The inner layer of the film is a polymer blend of 40 to 95% by weight of an ethylene based copolymer other than EVA and 5 to 60% by weight of a metallocene catalyzed polyethylene. Preferably, the polymer blend contains 65 to 85% by weight of the ethylene based copolymer and 15 to 35% of the metallocene catalyzed polyethylene.

Two groups of metallocene catalyzed polyethylene can be used to form the polymer blend (i) those having a melt flow ratio of $I_{10}/I_2 \geq 5.63$ and a molecular weight distribution, $M_w/M_n \leq (I_{10}/I_2)-4.63$ and (ii) those having a melt flow ratio of $I_{10}/I_2 < 6.53$ and a molecular weight distribution of $M_w/M_n > (I_{10}/I_2)-4.63$; the density of both groups is 0.85 to 0.97 grams/cubic centimeter.

$I_2$ is the melt index measured in accordance with ASTM D1238 (190° C./2.16 kg) and $I_{10}$ is the melt index measured in accordance with ASTM D 1238 (190° C./10 kg). Molecular weights, $M_w$ and $M_n$, are determined by GPC (gel permeation chromatography.

These metallocene catalyzed polyethylenes are made using conditions well known in the art for continuous polymerization. Typically polymerization temperatures of 0–250° C. and pressures from atmospheric to 1000 atmospheres (110 MPa) are used. Suspension, solution, slurry, gas phase or other polymerization methods can be used. A support for the catalyst can be used but preferably the catalysts are used in a homogeneous (soluble) manner. Suitable process conditions and catalysts that can be used to form the metallocene catalyzed polyethylenes used in this invention are disclosed in Lai, et. al., U.S. Pat. No. 5,278,272, Lia, et al., U.S. Pat. No. 5,272,236, DeChellis, et al., U.S. Pat. No. 5,405,922 and Turner, et al., U.S. Pat. No. 5,198,401 which patents are hereby incorporated by reference.

Typical metallocene catalyzed polyethylenes that can be used are m-LPE (linear polyethylene), LHDPE (linear high density polyethylene), LLDPE (linear low density polyethylene), ULLDPE (ultra low linear density polyethylene) each having a density in the range of 0.85 to 0.97. The metallocene catalyzed linear polyethylenes provide the best combination of low cost and good physical properties. However, under some circumstances blends of conventional polyethylenes be used, such as, HDPE (high density polyethylene), MDPE (medium density polyethylene) and LDPE (low density polyethylene) and one of the aforementioned metallocene catalyzed polyethylenes.

Typical ethylene based copolymers used in the inner layer of the film of this invention are ethylene/acid copolymers and ethylene/acid/alkyl(meth)acrylate copolymers containing 1–30% by weight, preferably 7–25% by weight of polymerized acid monomers such as acrylic acid or methacrylic acid. Generally, polymers having an acid content above 30% by weight are not made.

These ethylene based copolymers contain at least 50% of polymerized ethylene, 1 to 30% by weight of a polymerized acid constituent such as acrylic or methacrylic acid and 0 to 40% by weight of a polymerized alkyl (meth)acrylate. Particularly useful are ethylene/acid copolymers containing 75–93% by weight ethylene and 7–25% by weight of acrylic acid or methacrylic acid, such as an ethylene (88%)/methacrylic acid (12%) copolymer, an ethylene (81%)/methacrylic acid (19%) copolymer, an ethylene (85%)/methacrylic acid (15%) copolymer and an ethylene(80%)/acrylic acid (20%) copolymer.

Other useful copolymers contain at least 50% and preferably, 65 to 85% by weight polymerized ethylene, 7 to 25% by weight acrylic or methacrylic acid and 1–30% by weight of an alkyl (meth)acrylate. Typically, such copolymers contain butyl acrylate or butyl methacrylate but other (meth) acrylates can be used such as methyl, ethyl and propyl (meth)acrylates. Typical of such copolymers are ethylene/ methacrylic acid/n-butyl acrylate having a weight ratio of components of 67.5/9/23.5.

These copolymers are neutralized with a metallic ion and form ionomers in which 5 to 100%, preferably 30 to 70% of the acid groups are neutralized with a metallic ion selected from the following group: zinc, magnesium, sodium and lithium. Zinc and sodium are preferred since copolymers neutralized with these ions have FDA approval.

These ethylene based copolymers typically have a melt index (MI) of 0.5 to 200, preferably, 0.7 to 14 g/10 minutes determined by ASTM D 1238 using condition E (2190 g, 190° C.).

Typically useful polymer blends that can be used for the inner film are as follows:

80% by weight, based on the weight of the polymer blend, of an ionomer of a copolymer of 88% by weight ethylene/ 12% by weight methacrylic acid 50% neutralized with sodium and 20% by weight, based on the weight of the polymer blend, of metallocene catalyzed LLDPE having a density of 0.917 g/cc.

70% by weight, based on the weight of the polymer blend, of an ionomer of a copolymer of 88% by weight ethylene/ 12% by weight methacrylic acid 50% neutralized with sodium and 30% by weight, based on the weight of the polymer blend, of metallocene catalyzed LLDPE having a density of 0.917 g/cc.

A blend of an ionomer of a copolymer of 90% by weight ethylene/10% by weight methacrylic acid, 50% neutralized with sodium and a metallocene catalyzed LLDPE having a density of 0.917 g/cc blended in the following weight ratios 90/10, 80/20 and 70/30.

The thermoformable film of this invention preferably is made by a conventional blown film process in which the polymers that form the various layers of the film are charged into a conventional melt extruder and extruded through a circular die. For each layer of the film, there is separate extruder and the polymer for that layer is extruded through the circular die that has concentric circular openings in the die for each layer of polymer. Under circumstances in which two layers are the same, such as, in this invention where the two outer layers are EVA, one extruder can be used and the polymer stream from the extruder is split before it reaches the circular die. The layers of each of the different polymers are extruded through the opening in the die for that polymer into an air ring in which an air stream is forced through the center of the ring. The air stream expands the polymer streams that are being simultaneously extruded from the die and forces them into intimate contact. A continuous film is formed with the layers of polymer being adhered to each other. The resulting film is passed through nip rollers, slit into individual films and each film is wound onto a roll.

A typical blown film process that can be used to form the thermoformable film of this invention is described in "Film Extrusion Manual", TAPPI Press, 1992, Thomas I. Butler, Earl Veazey, editors.

The novel film of this invention is primarily used for packaging in which the package is made by thermoforming. Depending on the type of components used in the film, shallow draw or deep draw thermoforming can be used. This is done using conventional thermoforming techniques and equipment. One primary use of the film is for packaging one time use medical supplies. The package is thermoformed, the product inserted and then sealed and usually the package is sterilized. Sterilization can be accomplished by using a cover on the package such as Tyvek® spun bonded polyolefin that is permeable to a sterilizing gas, such as ethylene oxide. Tyvek® allows the gas to permeate into the package but does keep any microbes out of the package. Under some circumstances, it may be possible to use medical grade paper in place of Tyvek® to allow for sterilization and to keep microbes out of the package.

The following tests were used to evaluate the physical properties of the thermoformable films of the following examples:

Spencer Impact Strength—Described in ASTM D3420-REV91

Instron Probe Force—Similar to test described in ASTM D4830, except a blunt tipped probe of having a diameter of 1.9 cm and a speed of 5 cm/minute was used.

Tensile Strength—ASTM D882 Tensile

Elongation at Break—ASTM D882 Tensile

Gloss—ASTM D2457-REV90

Haze—ASTM D1003-REV92

Measurement of thermoformed web thickness in corners after thermoforming—Blown film samples were thermoformed on a Multivac R5200 machine. The web cavity was 20.3 cm by 12.7 cm and the draw depth was 3.2 cm. The forming temperature was 105° C. that is the optimum for each of the test samples. The film thickness of each corner was measured with a micrometer. The reported thickness was an average of 24 measurements (four corners from six formed webs)

The following examples illustrate the invention. All parts and percentages are on a weight basis unless otherwise indicated. MI (melt index) of the copolymers were determined as described above.

EXAMPLE 1

The following five thermoformable films were formed using conventional film blow molding equipment:

| Sample No. | Thickness of Layers of Sample | | |
|---|---|---|---|
| Film No. 1 | EVA (25 Microns) | Ionomer Resin (50 Microns) | EVA (25 microns) |
| Film No. 2 | EVA (18.75 Microns) | Ionomer Resin/m-m-LLPE ratio 80/20 (62.5 Microns) | EVA (18.75 Microns) |
| Film No. 3 | EVA (14.5 Microns) | Ionomer Resin/m-m-LLPE ratio 70/30 (71 Microns) | EVA (14.5 Microns) |
| Film No. 4 | EVA (25 Microns) | Ionomer Resin (50 Microns) | EVA/m-LLPE ratio 80/20 (25 Microns) |
| Film No. 5 | EVA (25 Microns) | Ionomer Resin (50 Microns) | m-LLPE (25 Microns) |

Abbreviations used above:

EVA—ethylene-vinyl acetate copolymer having 4.5% by weight vinyl acetate and 95.5% by weight ethylene and a melt index (MI) of 0.3 g/10 min.

Ionomer Resin—ethylene/methacrylic acid copolymer 88/12 weight ratio 50% sodium neutralized having a melt index (MI) of 1.6 g/10 min.

m-LLPE—metallocene catalyzed linear low density polyethylene having a density of 0.917 g/cc, a molecular weight distribution $M_w/M_n$ of 2.3 and melt flow ratio $I_{10}/I_2$ of 5.68.

Each of the above samples was formed using an air blown film line using standard equipment. The production condition which were essentially the same for all of the samples prepared were as follows:

Total film gauge—100 microns

Die set temperature—210° C.

Blow up ratio—2:1

Die gap—1.86 mm

Haul off speed—19.8 m/min.

Frost Line 31.28 cm (the point at which the molten film becomes a solid).

Film No. 1 is illustrative of the prior art. Films 2 and 3 illustrate the invention. Film 4 illustrates a film in which the same percentage of m-LLPE that is used in Films 2 and 3 is blended with an EVA outer layer rather than the inner layer containing ionomer resin. Film 5 illustrates a film in which the m-LLPE forms an outer layer rather than being blended with the ionomer resin in the inner layer.

Each of the above prepared Films 1–5 was subjected to the following tests: Spencer Impact Strength, Instron Probe Force (blunt tip), Tensile Strength, Elongation at Break (%) and optical properties (haze and gloss). The results of each of these test are shown in the following table:

| | SAMPLES | | | | |
|---|---|---|---|---|---|
| TEST | Film 1 | Film 2 | Film 3 | Film 4 | Film 5 |
| Spencer Impact | 24.6 J/mm | 36.9 J/mm | 39.1 J/mm | 28.7 J/mm | 28.3 J/mm |
| Instron Probe (blunt) | 101 J/MM | 106 J/mm | 108 J/mm | 102 J/mm | 96.5 J/mm |
| Tensile Strength (MPa) | MD 26.7 TD 22.7 | MD 30.0 TD 24.7 | MD 31.2 TD 26.8 | MD 27.0 TD 22.8 | MD 27.4 TD 24.2 |
| Elongation at Break (%) | MD 429 TD 490 | MD 496 TD 518 | MD 506 TD 550 | MD 429 TD 495 | MD 468 TD 516 |
| 20° Gloss | 111 | 109 | 100 | 104 | 83 |
| Total Haze | 4.9 | 5.6 | 6.6 | 5.5 | 12 |

MD—Machine direction TD—Transverse direction

The above data shows that there was a significant improvement in Spencer Impact Strength for Films 2 and 3 that represent the invention wherein the inner layer contains a blend of ionomer resin and metallocene catalyzed LLPE in comparison to prior art film (Film 1) that did not contain metallocene catalyzed LLPE in the inner layer. Also, there was a noticeable difference in Instron Probe Force, Tensile Strength and % Elongation at Break. Gloss was slightly less for Films 2 and 3 in comparison to Film 1 and haze was slightly more for Films 2 and 3 in comparison to Film 1 but both gloss and haze are acceptable for commercial purposes. Film 4 in which the m-LLPE was incorporated into one of the outer layers instead of the inner layer had significantly less Spencer Impact Strength in comparison to Films 3 and 4 (the invention) and Instron Probe Force, Tensile Strength and % Elongation at Break were noticeably less for Film 4 in comparison to Films 2 and 3. Optical properties of gloss and haze for Film 4 were similar to those of Films 2 and 3 (the invention). Film 5 had one outer layer of m-LLPE in place of EVA. Spencer Impact Strength was significantly less in comparison to Films 2 and 3 (the invention) and Instron Probe Force, Tensile Strength and % Elongation at Break were noticeably less for Film 5 in comparison to Films 2 and 3 Also, the optical properties of Film 5, gloss and haze were substantially poorer in comparison to Films 2 and 3 and would not be considered commercially acceptable.

Films 1–5 have very similar material costs. All had the same content of Ionomer Resin (50% of the total volume) and although the films had different levels of EVA and m-LLDPE, the difference did not cause changes in the cost of the film since both EVA and m-LLPDE have similar prices ($/lb.) and densities. The improvements in the film properties reflect true improvements in cost effectiveness.

Each of the Films 1–5 were thermoformed using conventional thermoforming equipment to a depth of about 3.2 cm in a cavity 20.3 cm long by 12.7 cm wide. The thickness of the corners in the thermoformed films was measured. The results are as follows, with each value being an average of 24 measurements (all four corners of six consecutive formed films were measured):

| Film Sample | Film 1 | Film 2 | Film 3 | Film 4 | Film 5 |
| --- | --- | --- | --- | --- | --- |
| Corner Thickness (microns) | 22.9 | 25.1 | 24.9 | 23.6 | 23.6 |
| 95% confidence interval (microns) | 0.61 | 0.53 | 0.76 | 0.76 | 0.99 |

Corner thickness data showed improved thermoformability with the films of the invention (Films 2 and 3) over the prior art (Film 1). Blending the m-LLDPE in the EVA layer (Film 4) gave reduced formability as did replacing the EVA layer with m-LLDPE (Film 5).

What is claimed is:

1. A thermoformable film comprising a composite structure comprising at least three layers firmly adhered to one another, a top and bottom layer and an inner layer;
   wherein the top and bottom layer of the composite structure comprise a film layer of ethylene-vinyl acetate copolymer consisting essentially of 1 to 25% by weight, based on the weight of the copolymer, of a polymerized vinyl acetate and 75 to 99% by weight, based on the weight of the copolymer, of polymerized ethylene and the inner layer of the composite structure comprises a film of a polymer blend consisting essentially of
   (a) 40 to 95% by weight, based on the weight of the polymer blend, of an ethylene based copolymer having a melt index of 0.5 to 200 g/10 minutes determined according to ASTM D 1238 Condition E, said ethylene based copolymer consisting essentially of repeating polymerized units of
      (1) 75 to 93% by weight, based on the weight of the copolymer, of ethylene; and
      (2) 7 to 25% by weight, based on the weight of the copolymer, of acrylic acid or methacrylic acid; and
   wherein 30 to 70% of the acid groups of the acrylic acid or methacrylic acid of the ethylene based copolymer are neutralized with metal ion selected from the group consisting of zinc, magnesium, sodium and lithium; and
   (b) 5 to 60% by weight, based on the weight of the polymer blend, of a metallocene catalyzed linear polyethylene.

2. The thermoformable film of claim 1, wherein the inner layer consists essentially of a polymer blend of 65 to 85% by weight of the ethylene based copolymer and 15 to 35% by weight of the metallocene catalyzed linear polyethylene, based on the weight of the polymer blend.

3. A thermoformable film comprising a composite structure comprising at least three layers firmly adhered to one another, a top and bottom layer and an inner layer;
   wherein the top and bottom layer of the composite structure comprise a film layer of ethylene-vinyl acetate copolymer consisting essentially of 1 to 25% by weight, based on the weight of the copolymer, of a polymerized vinyl acetate and 75 to 99% by weight, based on the weight of the copolymer, of polymerized ethylene and the inner layer of the composite structure comprises a film of a polymer blend consisting essentially of
   (a) 40 to 95% by weight, based on the weight of the polymer blend, of an ethylene based copolymer having a melt index of 0.5 to 200 g/10 minutes determined according to ASTM D 1238 Condition E, said ethylene based copolymer consisting essentially of repeating polymerized units of
      (1) at least 50% by weight based on the weight of the copolymer, of ethylene,
      (2) 7 to 25% by weight, based on the weight of the copolymer, of acrylic acid or methacrylic acid; and
      (3) 1 to 30% by weight, based on the weight of the copolymer, of an alkyl acrylate or an alkyl methacrylate,
   wherein 30 to 70% of the acid groups of the acrylic acid or methacrylic acid of the ethylene based copolymer are neutralized with metal ion selected from the group consisting of zinc, magnesium, sodium and lithium; and
   (b) 6 to 60% by weight, based on the weight of the polymer blend, of a metallocene catalyzed linear polyethylene.

4. The thermoformable film of claim 3, wherein the inner layer consists essentially of a polymer blend of 65 to 85% by weight of the ethylene based copolymer and 15 to 35% by weight of the metallocene catalyzed linear polyethylene, based on the weight of the polymer blend.

5. A thermoformed package comprising a thermoformable film comprising a composite structure comprising at least three layers firmly adhered to one another, a top and bottom layer and an inner layer;
   wherein the top and bottom layer of the composite structure comprise a film layer of ethylene-vinyl acetate copolymer consisting essentially of 1 to 25% by weight, based on the weight of the copolymer, of a polymerized vinyl acetate and 75 to 99% by weight, based on the weight of the copolymer, of polymerized ethylene and the inner layer of the composite structure comprises a film of a polymer blend consisting essentially of
   (a) 40 to 95% by weight, based on the weight of the polymer blend, of an ethylene based copolymer having a melt index of 0.5 to 200 g/10 minutes determined according to ASTM D 1238 Condition E, said ethylene based copolymer consisting essentially of repeating polymerized units of
      (1) 75 to 93% by weight, based on the weight of the copolymer, of ethylene; and
      (2) 7 to 25% by weight, based on the weight of the copolymer, of acrylic acid or methacrylic acid; and
   wherein 30 to 70% of the acid groups of the acrylic acid or methacrylic acid of the ethylene based copolymer are neutralized with metal ion selected from the group consisting of zinc, magnesium, sodium and lithium; and (b) 5 to 60% by weight, based on the weight of the polymer blend, of a metallocene catalyzed linear polyethylene, thermoformed into a shaped structure for holding an object and having a cover positioned on the thermoformed shaped structure and firmly adhered to the film.

6. The thermoformed package of claim 5 in which the cover is a non-woven polyolefin web.

7. A thermoformed package comprising a thermoformable film comprising a composite structure comprising at least three layers firmly adhered to one another, a top and bottom layer and an inner layer;

wherein the top and bottom layer of the composite structure comprise a film layer of ethylene-vinyl acetate copolymer consisting essentially of 1 to 25% by weight, based on the weight of the copolymer, of a polymerized vinyl acetate and 75 to 99% by weight, based on the weight of the copolymer, of polymerized ethylene and the inner layer of the composite structure comprises a film of a polymer blend consisting essentially of (a) 40 to 95% by weight, based on the weight of the polymer blend, of an ethylene based copolymer having a melt index of 0.5 to 200 g/10 minutes determined according to ASTM D 1238 Condition E, said ethylene based copolymer consisting essentially of repeating polymerized units of (1) at least 50% by weight, based on the weight of the copolymer, of ethylene, (2) 7 to 25% by weight, based on the weight of the copolymer, of acrylic acid or methacrylic acid; and (3) 1 to 30% by weight, based on the weight of the copolymer, of an alkyl acrylate or an alkyl methacrylate, wherein 30 to 70% of the acid groups of the acrylic acid or methacrylic acid of the ethylene based copolymer are neutralized with metal ion selected from the group consisting of zinc, magnesium, sodium and lithium; and (b) 5 to 60% by weight, based on the weight of the polymer blend, of a metallocene catalyzed linear polyethylene, thermoformed into a shaped structure for holding an object and having a cover positioned on the thermoformed shaped structure and firmly adhered to the film.

8. The thermoformed package of claim 7 in which the cover is a non-woven polyolefin web.

* * * * *